(12) United States Patent  
Kim et al.

(10) Patent No.: US 9,301,222 B2  
(45) Date of Patent: *Mar. 29, 2016

(54) METHOD FOR CONTROLLING ACCESS OF TERMINAL TO HOME (E)NODEB

(71) Applicant: LG Electronics Inc., Seoul (KR)

(72) Inventors: Tae-Hyeon Kim, Anyang (KR); Lae-Young Kim, Anyang (KR); Hyun-Sook Kim, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/744,992

(22) Filed: Jun. 19, 2015

(65) Prior Publication Data  
US 2015/0289175 A1 Oct. 8, 2015

Related U.S. Application Data

(63) Continuation of application No. 13/934,060, filed on Jul. 2, 2013, now Pat. No. 9,084,160, which is a continuation of application No. 12/625,612, filed on Nov. 25, 2009, now Pat. No. 8,503,392.

(60) Provisional application No. 61/162,649, filed on Mar. 23, 2009, provisional application No. 61/173,973, filed on Apr. 30, 2009.

(30) Foreign Application Priority Data

Aug. 17, 2009 (KR) .................. 10-2009-0075888

(51) Int. Cl.  
*H04W 36/00* (2009.01)  
*H04W 4/08* (2009.01)  
(Continued)

(52) U.S. Cl.  
CPC ............ *H04W 36/0072* (2013.01); *H04W 4/08* (2013.01); *H04W 12/08* (2013.01); *H04W 36/0055* (2013.01); *H04W 84/045* (2013.01)

(58) Field of Classification Search  
None  
See application file for complete search history.

(56) References Cited

U.S. PATENT DOCUMENTS

2007/0183427 A1  8/2007  Nylander et al.  
2007/0213060 A1  9/2007  Shaheen  
(Continued)

FOREIGN PATENT DOCUMENTS

CN  101296451 A  10/2008  
KR  10-2007-0073365 A  7/2007  
WO  WO 2007/089560 A1  8/2007

OTHER PUBLICATIONS

3rd Generation Partnership Project, Technical Specification Group Services and System Aspects, General Packet Radio Service (GPRS) enhancements for Evolved Universal Terrestrial Radio Access Network (E-UTRAN) access (Release 9), 3GPP TS 23.401, V9.5.0 (Jun. 2010), pp. 1-259.

(Continued)

*Primary Examiner* — Diane Lo  
(74) *Attorney, Agent, or Firm* — Birch, Stewart, Kolasch & Birch, LLP

(57) ABSTRACT

A method for transmitting information of a user equipment (UE) by a mobility management entity (MME) is discussed. The method according to one embodiment includes generating, by the MME, a request message including an indication of whether the UE is a closed subscriber group (CSG) member; and transmitting, by the MME, the request message to a cell. The request message is one of a UE context change request message and a handover request message. The UE context change request message is an S1 AP UE Context Modification Request message. The UE context change request message is transmitted when the UE is connected to the cell, the cell is operating in a hybrid access mode, and when the MME detects that a CSG membership of the UE to the cell has expired.

5 Claims, 10 Drawing Sheets

(51) Int. Cl.
*H04W 12/08* (2009.01)
*H04W 84/04* (2009.01)

(56) References Cited

U.S. PATENT DOCUMENTS

| | | |
|---|---|---|
| 2007/0291695 A1 | 12/2007 | Sammour et al. |
| 2008/0043658 A1 | 2/2008 | Worrall |
| 2008/0090583 A1 | 4/2008 | Wang et al. |
| 2009/0047960 A1 | 2/2009 | Gunnarsson et al. |
| 2009/0129342 A1 | 5/2009 | Hwang et al. |
| 2010/0197307 A1 | 8/2010 | Horn et al. |
| 2011/0116477 A1 | 5/2011 | Wu |
| 2011/0269468 A1 | 11/2011 | Sundell et al. |

OTHER PUBLICATIONS

Nokia Corporation et al., "HNB and HeNB Requirements", 3GPP TSG-RAN WG2 Meeting #61bis, R2-081527, Shenzhen, China, Mar. 31-Apr. 4, 2008, 5 pages.

FIG. 3
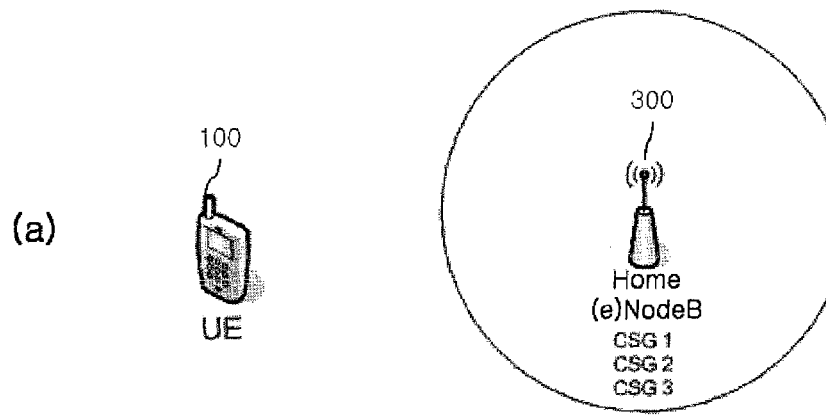
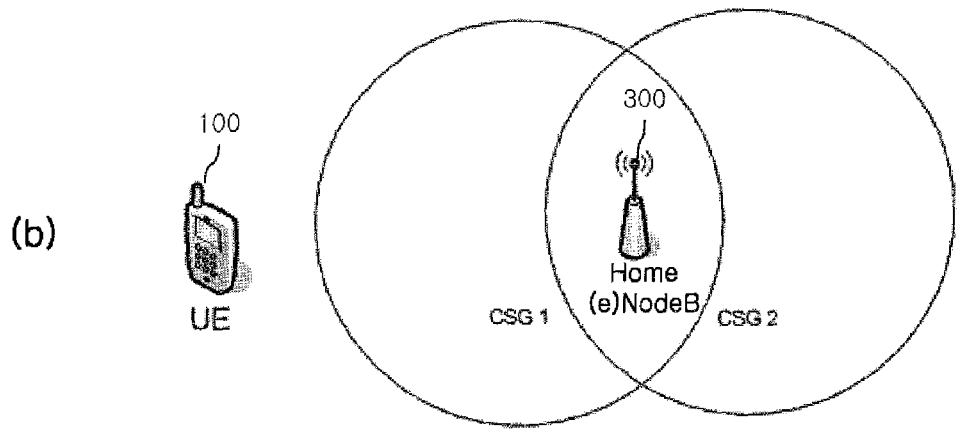

METHOD FOR CONTROLLING ACCESS OF TERMINAL TO HOME (E)NODEB

CROSS-REFERENCE TO RELATED APPLICATIONS

This application is a Continuation of co-pending U.S. patent application Ser. No. 13/934,060 filed on Jul. 2, 2013, which is a Continuation of U.S. application Ser. No. 12/625,612 filed Nov. 25, 2009, now U.S. Pat. No. 8,503,392, which claims the benefit of U.S. Provisional Application Nos. 61/162,649 filed on Mar. 23, 2009 and 61/173,973 filed on Apr. 30, 2009, and which claims priority to Korean Patent Application No. 10-2009-0075888, filed on Aug. 17, 2009. The entire contents of all these application are hereby incorporated by reference.

BACKGROUND OF THE INVENTION

1. Field of the Invention

The present invention relates to a mobile communication system, and particularly, to a Home(e)NodeB system in a mobile communication system.

2. Background of the Invention

In the field of 3GPP that regulates technical standards of the third generation mobile communication system, since the end of 2004, has started researches for Long Term Evolution/System Architecture Evolution (LTE/SAE) techniques to optimize and enhance functions of 3GPP techniques in correspondence to a plurality of forums and new techniques relevant to the 4th generation mobile communication.

The SAE based on the 3GPP SA WG2 relates to a network technique for determining a network structure and supporting mobility of a heterogeneous radio network system with cooperating with an LTE operation of the 3GPP TSG RAN. The SAE, one of the most important standardization issues of the 3GPP, is implemented to develop a 3GPP system into a system that supports various wireless access techniques based on IP. More concretely, the SAE has been implemented for an optimized packet-based system capable of minimizing transmission delay with an enhanced data transmission capability.

A conceptual reference model of the SAE, defined by 3GPP SA WG2 includes a non-roaming case, and a roaming case having various scenarios. Details of the conceptual reference model can be referred from TS 23.401 and TS 23.402 which are 3GPP standard documents. This may be schematically reconfigured in FIG. 1.

FIG. 1 is a structural view of an evolved mobile communication network.

One of the most representative characteristics of the network of FIG. 1 is that a structure is based on a two-layer model (2 Tier Model), an evolved NodeB (so-called eNodeB) of an Evolved UTRAN and a Gateway of a Core Network. The eNodeB has similar functions to them of both a RNC and a NodeB of the conventional UMTS system. And, the Gateway has a similar function to it of the conventional SGSN/GGSN.

Another important characteristic of the network is that a Control Plane and a User Plane between an Access Network and a Core Network are interchanged to each other through different interfaces. In the conventional UMTS system, one interface (1u) exists between an RNC and an SGSN. However, since a Mobility Management Entity (MME) which processes a control signal is separated from a Gateway (GW), two interfaces (i.e, S1-MME and S1-U) were respectively used.

FIG. 2 shows an (e)NodeB and a Home (e)NodeB.

In the 3rd or 4th generation mobile communication system, efforts to increase a cell capacity have been ongoing in order to support high-capacity service such as multimedia contents and streaming, and a bi-directional service.

As various techniques for transmitting a large amount of data in addition to multimedia relating techniques are required, many methods for increasing wireless capacity have been researched. One of the methods include a method for allocating frequency resources as much as possible. However, there have been limitations in allocating limited frequency resources to a plurality of users as much as possible.

In order to increase a cell capacity, there are efforts to use a high frequency bandwidth, and to reduce a cell radius. When cells having a small radius, such as pico cells are used, a frequency bandwidth of the cell can increase highly than that in the conventional cellular system thus to transmit more information. However, in this case, more base stations have to be installed in the same area, which results in high costs.

In order to increase a cell capacity by using a small cell, a Home (e)NodeB 30 has been proposed.

The Home (e)Node 30 has been researched based on RAN WG3 of the 3GPP (e)NodeB, and is being intensively applied to SA WG.

Referring to FIG. 2, an (e)NodeB (or NodeB) 20 may correspond to a macro-base station, whereas a Home (e)NodeB (or Home NodeB) 30 may correspond to a femto-base station. In the specification, the terms will be explained based on the 3GPP. And, the (e)NodeB 20 will be used so as to indicate 'NodeB' or 'eNodeB', and the Home (e)NodeB 30 will be used so as to indicate 'Home NodeB' or 'Home eNodeB'.

A cell of the Home (e)NodeB 20 is implemented in an Open Access Mode, a Closed Access Mode, and a Hybrid Access Mode.

In the case of the Open Access mode, the cell of the Home (e)NodeB 20 provides service to all serviceable terminals without limitations.

In the case of the Closed Access mode, the cell of the Home (e)NodeB 20 permits access of only allowed terminals.

In UMTS/EPS of the 3GPP standard, it has been proposed that one or more Home (e)NodeBs operated in the Closed Access mode forms one Closed Subscriber Group (CSG). That is, one CSG may be composed of one or more Home (e)NodeBs, and the terminal also receives one a permission (e.g., one CSG membership) to access the cell of the Home (e)NodeB. Here, the terminal may have one or more CSG membership to access one or more CSGs, and may have time information allowed according to each CSG Information on accessible CSGS is called as an Allowed CSG List. This allowed CSG list is stored in the terminal, and a network entity such as MME, SGSN, MSC, HSS, and HLR.

Access control is performed according to the allowed CSG list. For instance, if accessible time to the CSG has expired or a permission to access the CSG has been deleted (or expired) while the terminal receives service, a handover to a suitable cell is executed. That is, a handover to a peripheral CSG, or to a NodeB (or eNodeB) corresponding to a macro-base station is executed.

In the related art, if accessible time to the CSG has expired or a permission to access the CSG has been deleted, the terminal may execute a handover to a suitable cell. However, concrete methods thereof have not been disclosed.

In order to perform a handover from a first CSG to which the terminal is being accessed to a second CSG, a status of wireless resources (i.e. whether the terminal is accessible to the second CSG) has to be considered. However, this has not been disclosed in the related art.

For the consideration, signal transmission between relevant entities is required as much as possible. However, the related art has not disclosed appropriate solutions relating thereto, which causes waste of wireless resources.

Furthermore, even if the terminal has not found a suitable CSG, a handover to a macro-cell (NodeB or eNodeB) has to be executed so as to ensure service continuity. This may depart from the original purpose of the Home (e)Node B for reducing the amount of resources usage by the macro base station.

SUMMARY OF THE INVENTION

Therefore, an object of the present invention is to provide a method for allowing a terminal to perform a handover to a cell of a Home (e)NodeB corresponding to another closed subscriber group (CSG) by a Home (e)NodeB.

Another object of the present invention is to provide a method capable of efficiently using wireless resources of a Home (e)NodeB and a macro base station, and capable of minimizing signaling exchange while ensuring service continuity to a terminal when accessible time to a closed subscriber group (CSG) has expired or a permission to access the CSG has been deleted.

To achieve these and other advantages and in accordance with the purpose of the present invention, as embodied and broadly described herein, there is provided a method for controlling access of a terminal to a Home (e)NodeB by a network entity, the terminal accessed to the Home (e)NodeB operated in a closed access mode or a hybrid access mode by using a specific closed subscriber group (CSG) ID, the method comprising: recognizing by the network entity, that a timer, which designates allowable time to access to the Home (e)NodeB by using a specific closed subscriber group (CSG) ID has expired; transmitting a bearer update request message to other network entity in order to change a membership for the expired CSG ID; transmitting a bearer modify request message to the Home (e)NodeB in order to change a membership for the expired CSG ID; and updating a bearer with said other network entity, and a bearer with the Home (e)NodeB.

At least one of the bearer update request message and the bearer modify request message may be a message including information about a new membership and QoS-related information, or may be a message including information about a specific membership and QoS-related information. At least one of the bearer update request message and the bearer modify request message may further include at least one of an indicator indicating membership change (e.g., CSG member, non-CSG member), an indicator indicating membership expiration, an expired_indicator, and a deleted_indicator.

The method may further comprise receiving an Update Bearer Response message by the network entity from said other network entity.

The network entity may be a Mobility Management Entity (MME).

Said other network entity may be a serving gateway (S-GW) or a serving GPRS support node (SGSN).

The step of recognizing may comprise receiving a message notifying that the timer has expired, from a specific entity located in a network and monitoring the allowed access timer.

The step of recognizing may further comprise monitoring the timer by the network entity.

The method may further comprise transmitting, to the Home (e)NodeB, a message notifying membership change of the terminal (S604).

The message notifying membership change of the terminal may be an S1 AP UE Context Modification Request message, or a UE Context Update message.

The message notifying membership change of the terminal may be a message including information about a new membership and QoS-related information, or may be a message including information about a specific membership and QoS-related information. At least one of the messages may further include at least one of an indicator indicating membership change, an indicator indicating membership expiration, an expired_indicator, and a deleted_indicator.

The bearer update request message may be an Update Bearer Request Message, and the bearer modify request message may be a Bearer Modify Request.

To achieve these and other advantages and in accordance with the purpose of the present invention, as embodied and broadly described herein, there is also provided a network entity configured to control access of a terminal to a Home (e)NodeB, the terminal accessed to the Home (e)NodeB operated in a closed access mode or a hybrid access mode by using a specific closed subscriber group (CSG) ID, the network entity comprising: a transceiver; and a controller configured to recognize that a timer, which designates allowable time to access to the Home (e)NodeB by using a specific closed subscriber group (CSG) ID has expired, configured to transmit, through the transceiver, an Update Bearer Request Message to other network entity and a Bearer Modify Request Message to the Home (e)NodeB in order to change a membership of the expired CSG ID, and configured to update a bearer with said other network entity and a bearer with the Home (e)NodeB.

In the present invention, access of the terminal to the Home (e)NodeB may be effectively controlled by minimizing signaling exchange in a network, and by reducing the amount of resources usage of a macro base station.

Especially, when accessible time of the terminal to the CSG has expired or a permission of the terminal to access the CSG has been deleted, unnecessary handovers are prevented through suitable access control. This may enhance the efficiency of the network and wireless resources.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is conceptual views of access modes for explanation of preferred embodiments of the present invention;

DETAILED DESCRIPTION OF THE INVENTION

Figure 1:
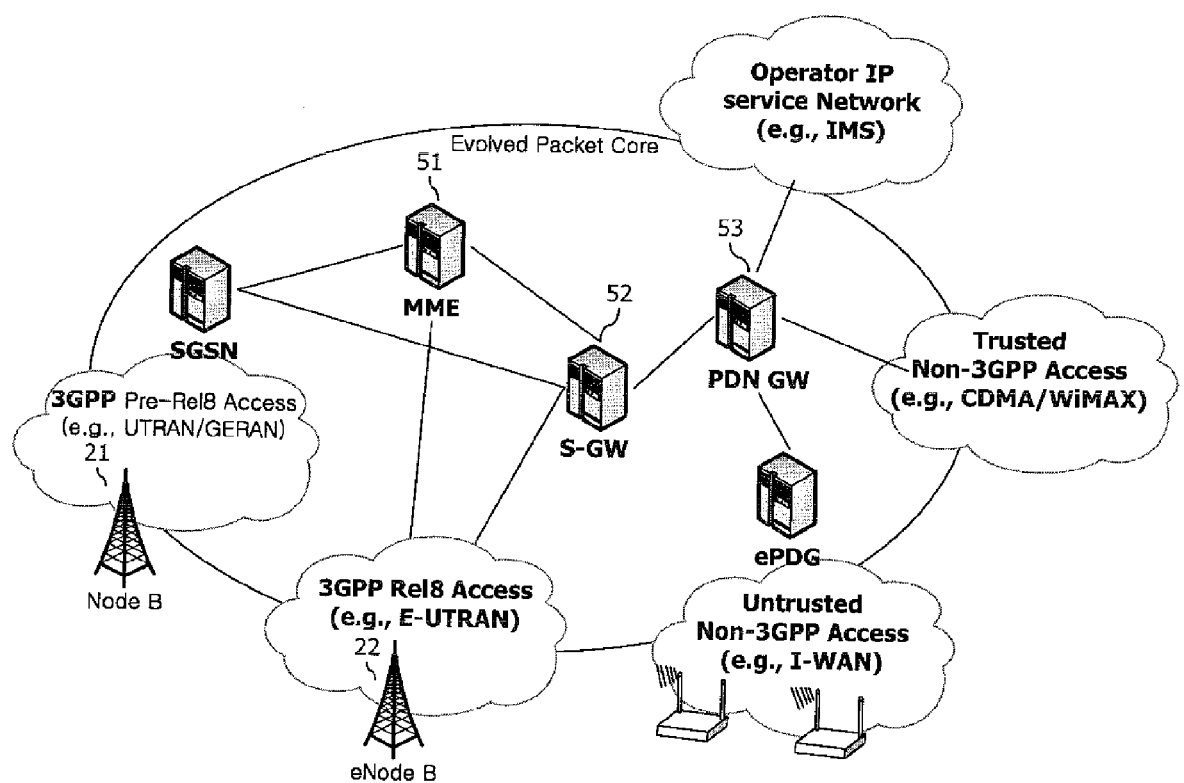
FIG. 1 is a structural view of an evolved mobile communication network.
Figure 2:
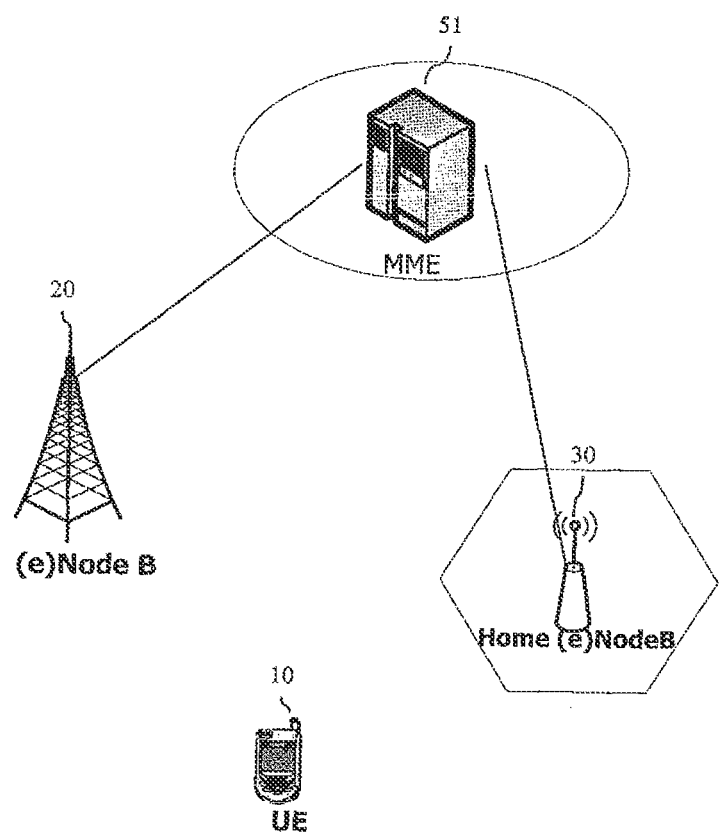
FIG. 2 shows a relation between an (e)NodeB and a Home (e)NodeB.

Description will now be given in detail of the present invention, with reference to the accompanying drawings.

The present invention is applied to a Home (e)NodeB system. However, the present invention is not limited to this, but may be applied to all communication systems and methods to which the techniques of the present invention are applicable.

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

When it is mentioned that one component is "connected" or "accessed" to another component, it may be understood that the one component is directly connected or accessed to the another component or that still other component is interposed between the two components. In the meantime, when it is mentioned that one component is "directly connected" or "directly accessed" to another component, it may be understood that no component is interposed therebetween.

Hereinafter, preferred embodiments of the present invention will be explained in more detail with reference to the attached drawings. The same or similar components of one embodiment as or to those of another embodiment will be provided with the same or similar reference numerals, and their detailed explanations will be omitted. And, if it is judged that detailed descriptions of the related art are not within the range of the present invention, the detailed descriptions will be omitted.

Hereinafter, the term of a 'mobile terminal' will be used. The mobile terminal may be also referred to as a user equipment (UE), a mobile equipment (ME), and a mobile station (MS). The UE may be a mobile device having a communication function, such as a portable phone, a PDA, a smart phone, and a notebook. Also, the UE may be an immobile device such as a PC and a vehicle mounted device.

And, the term of a 'Home (e)NodeB will be used hereinafter. The 'Home (e)NodeB may be referred to as a 'femtocell', a 'home NodeB', and a 'home eNodeB'.

Hereinafter, the terms used in the present invention will be briefly defined for understanding.

UMTS: An abbreviation of a Universal Mobile Telecommunication System, which signifies the $3^{rd}$ generation mobile communication network.

EPS: An abbreviation of an Evolved Packet System, which signifies a core network that supports a long term evolution (LTE) network, and a network evolved from the UMTS.

NodeB: A base station of a UMTS network, which is installed outdoors and has a cell coverage size corresponding to a macro cell.

eNodeB: A base station of an EPS network, which is installed outdoors and has a cell coverage size corresponding to a macro cell.

(e)NodeB: A term indicating a NodeB and an eNodeB.

Home NodeB: A base station of a UMTS network, which is installed indoors and has a cell coverage size corresponding to a femto cell.

Home eNodeB: A base station of an EPS network, which is installed indoors and has a cell coverage size corresponding to a femto cell.

Home (e)NodeB: A term indicating a Home NodeB and a Home eNodeB.

Home (e)NodeB gateway: A gateway performing an interfacing with a core network by being connected to one or more Home(e)NodeBs.

Home (e)NodeB sub-system: A sub-system that manages a wireless network by combing a Home (e)NodeB and a Home (e)NodeB gateway as one set. The Home (e)NodeB sub-system and the Home (e)NodeB manage a wireless network, and are interworked with a core network. Therefore, the Home (e)NodeB sub-system and the Home (e)NodeB may be considered as one set. Accordingly, the terms of the Home (e)NodeB and the Home (e)NodeB sub-system will be used together.

Access control: An operation to allow access of a terminal to a system such as a Home (e)NodeB, or to handover the terminal to other access system.

Service continuity: A function to maintain the current service even if a service direction in a mobile communication system is changed to other cell or access system.

Closed Subscriber Group (CSG): A term indicating one or more Home (e)NodeB groups. The Home (e)NodeB groups that belong to the CSG have the same CSG identifier (ID). And, each user receives a permission message according to each CSG PCC (Policy and Charging Control): An operation for an operator's policy and charging.

PCRF (Policy and Charging Rule Function): A network element for performing the PCC, and provides an operator policy and a charging rule to another entity.

In the present invention, even if accessible time to the CSG has expired or a permission to access the CSG has been deleted, the frequency of handovers is reduced as much as possible. Accordingly, the efficiency of the access control is enhanced. That is, it is determined whether or not a cell of the Home (e)NodeB to which a terminal is being accessed can continuously provide service to the terminal. This may allow unnecessary handovers to be reduced, thereby enhancing management of a network and wireless resources.

Hereinafter, the method for controlling access in a Home (e)NodeB will be explained in more detail with reference to the attached drawings.

FIG. 3 is conceptual views of access modes for explanation of preferred embodiments of the present invention.

The Home (e)NodeB 300 may operate in a Closed Access Mode, an Open Access Mode, and a Hybrid Access Mode. In the closed access mode (or limited access mode), only terminals having CSG membership (or accounts) are accessible to the Home (e)NodeB 300. In the open access mode, the Home (e)NodeB 300 operates in the same manner as a normal cell having no concept of a CSG In this case, general all UEs are accessible to the Home (e)NodeB 300. In the hybrid access mode, the Home (e)NodeB 300 operates in both the closed access mode and the open access mode.

The open access mode is not within the range of the present invention. Accordingly, FIG. 3 shows an access control method in the closed access mode and the hybrid access mode.

FIG. 3A shows an example of the closed access mode. In the closed access mode, the Home (e)NodeB 300 operates as a closed subscriber group (CSG). The Home (e)NodeB 300 stores an ID list of CSGs. For instance, the Home (e)NodeB supports a first CSG (a CSG ID is "CSG 1"), a second CSG (a CSG ID is "CSG 2"), and a third CSG (a CSG ID is "CSG 3").

Referring to FIG. 3A, the terminal (or UE 100) has memberships (or accounts) to the first CSG ("CSG 1") and the second CSG ("CSG 2") of the Home (e)NodeB 300 and is connected to the Home (e)NodeB 300 by using a membership to the first CSG ("CSG 1") thus to receive a service.

In such situation, even if accessible time (or allowed time) of the current membership (or account) to the first CSG ("CSG 1") has expired, the Home (e)NodeB 300 can not handover the terminal (or UE 100) to other base station such as other home (e)NodeB, Instead, the Home (e)NodeB 300 can change the current CSG ID ("CSG 1") for the terminal (or UE 100) into another CSG ID (or a different CSG ID or new CSG ID)(e.g., "CSG 2") to maintain a provision of the service to the UE 100.

To do this, the Home (e)NodeB 300 compares its CSG ID list with an allowed CSG list for the UE 100. The allowed CSG list includes information on CSGs to which the terminal (or UE 100) has a membership. As illustrated in FIG. 3A, the allowed CSG list includes information on the first CSG ("CSG 1") and the second CSG ("CSG 2").

As results from the comparison, it is determined that at least one CSG ID in the CSG list of the Home (e)NodeB 300 is matched with it in the allowed CSG list for the UE 100 (or there is at least one matched CSG ID in both the lists), and the matched CSG ID has not expired yet, a membership to matched the CSG ID having not expired yet can be used.

Figure 4:
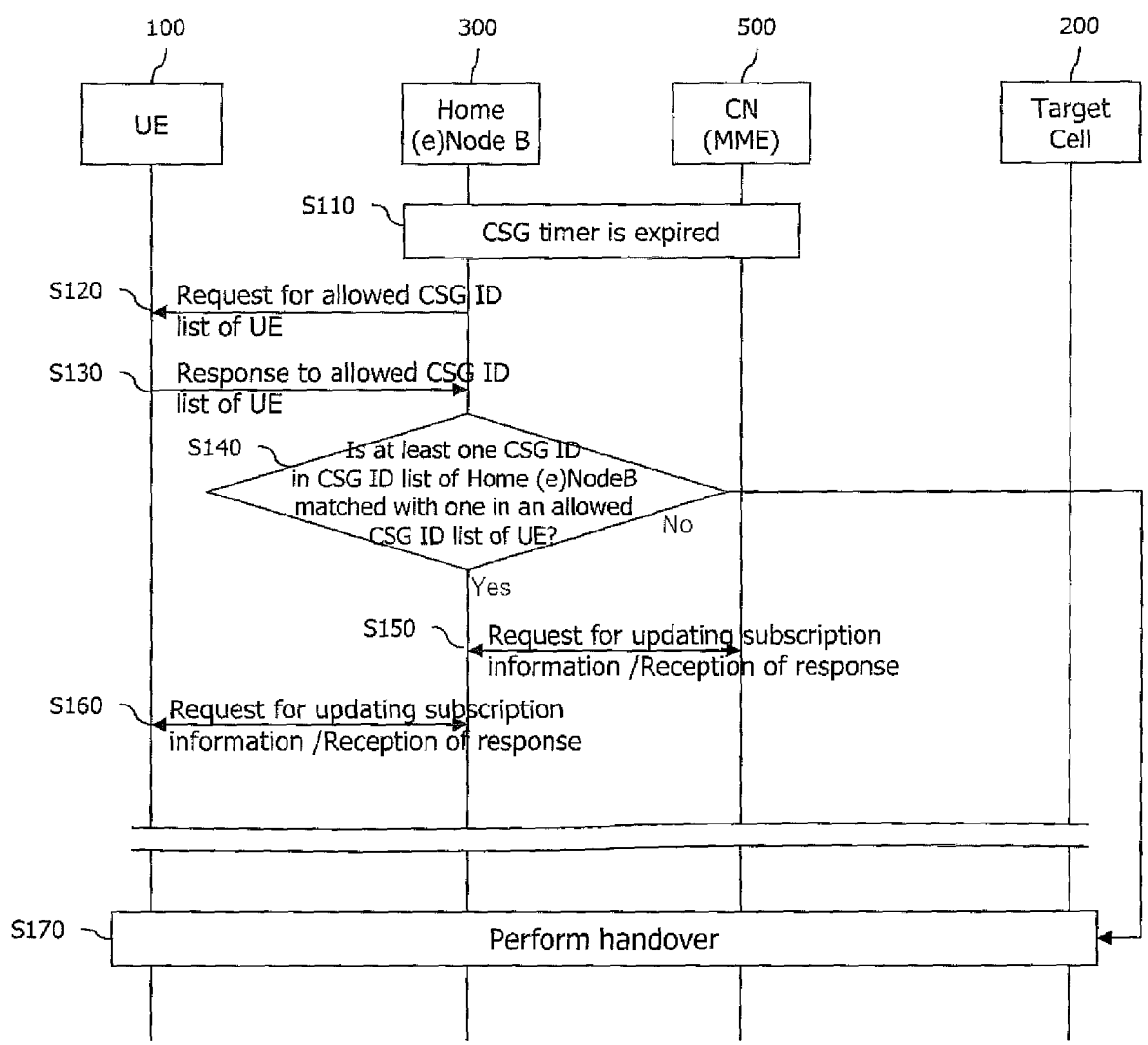
FIG. 4 is a flowchart showing a method for controlling access in a Home (e)NodeB operated in a closed access mode according to a first embodiment of the present invention.
Figure 5:
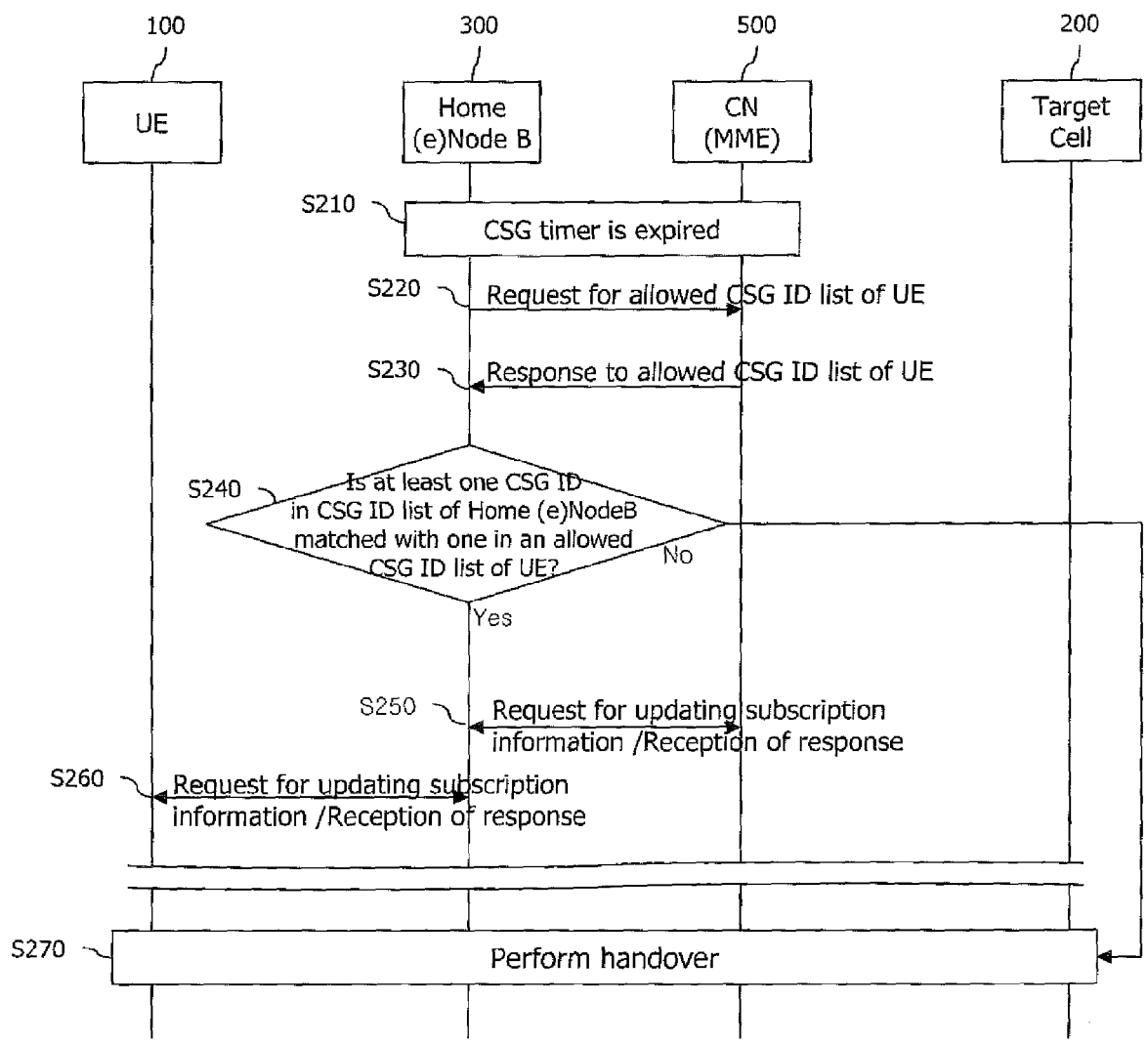
FIG. 5 is a flowchart showing a method for controlling access in a Home (e)NodeB operated in a closed access mode according to a second embodiment of the present invention.
Figure 6:
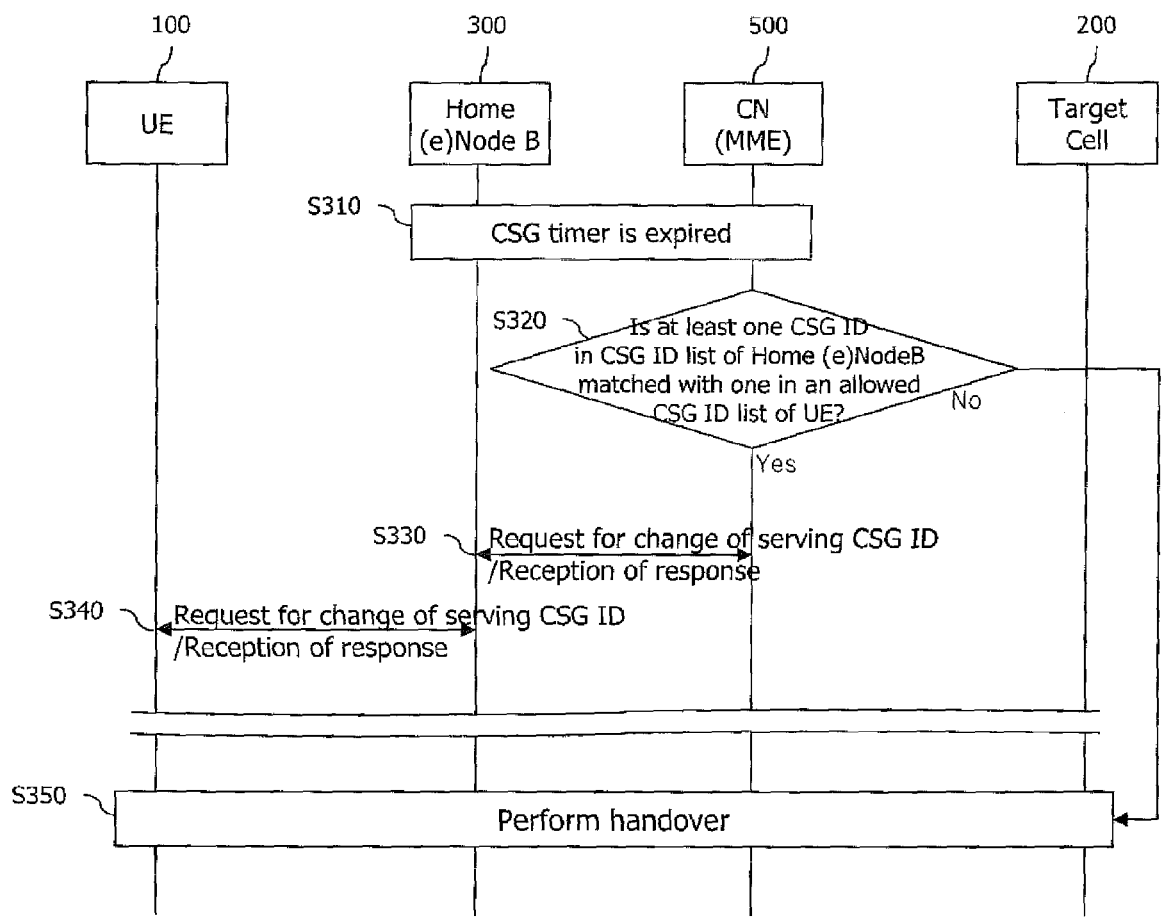
FIG. 6 is a flowchart showing a method for controlling access in a Home (e)NodeB operated in a closed access mode according to a third embodiment of the present invention.

As shown in FIGS. 4 to 6, there area various method for changing the current CSG ID for the UE 100 to another CSG ID for service continuity to the UE 100. For example, the various methods may be performed between the UE 100 and the Home (e)NodeB 300, or between the Home (e)NodeB 300 and a network entity, or by the network entity 500, exclusively. This will be explained in more detail with reference to FIGS. 4 to 6. Here, the network entity may also indicate a Home Subscriber Server (HSS), an Application Server (AS), a Home Location Register (HLR), a User Repository, etc. The network entity to be explained hereinafter signifies at least one of the aforementioned entities, or the combination thereof.

FIG. 3B shows an example of the hybrid access mode.

The Home (e)NodeB 300 operated in the hybrid access mode provides service to both UEs having a CSG membership, and UE having not the CSG membership (or UEs of a non-CSG). In other words, the UEs of a non-CSG may use the Home (e)NodeB without any membership (or permission). However, the UEs in the non-CSG may access to the Home (e)NodeB with a service quality lower than that in the CSG.

The terminal (or UE 100) has a membership (or accounts) to the first CSG ("CSG 1") of the Home (e)NodeB 300 and a membership to "CSG 5" of other Home (e)NodeB and is connected to the Home (e)NodeB 300 by using the membership to the first CSG ("CSG 1") thus to receive a service.

In such situation, even If an accessible time (or allowed time) of the current membership of the terminal to the first CSG ("CSG 1") has expired, the Home (e)NodeB 300 checks whether the membership of a specific ID of the UE 100 can be changed to a non-CSG member. According to a result of the check, the membership of the UE 100 is changed to a non-CSG member. Then, the current service is continuously maintained.

FIG. 4 is a flowchart showing a method for controlling access in a Home (e)NodeB operated in a closed access mode according to a first embodiment of the present invention.

FIG. 4 shows a UE 100, a Home (e)NodeB (e.g., femto-base station), a core network (CN) 500, and a target cell 200.

The core network 500 may include a Mobility Management Entity (MME), a serving GPRS support node (SGSN), a Mobile-services Switching Centre (MSC), a Home Subscriber Server (HSS), a Home Location Register (HLR), a User Repository, etc. The target cell 200 may be a femto-base station such as the Home (e)NodeB 300, or a macro-base station such as an (e)NodeB.

According to the first embodiment of the present invention, if accessible time (or allowed time) of the current membership of the terminal to a current (or specific) CSG ID of the Home (e)NodeB 300 has expired while the UE 100 is receiving a service from the Home (e)NodeB 300, the Home (e)NodeB 300 compares a CSG ID list stored therein with an allowed CSG ID list for the UE 100. As results from the comparison, it is determined that at least one CSG ID in the CSG ID list for the UE 100 is matched with it in the CSG ID list of the Home (e)NodeB 300, the Home (e)NodeB 300 changes the current (or specific) CSG ID for the UE 100 to another CSG ID (or new CSG ID)(i.e., the matched CSG ID) without any handover. Accordingly, the Home (e)NodeB 300 may continuously provide service to the UE 100. Once the current (or specific) CSG ID for the UE 100 is changed to the another CSG ID, the Home (e)NodeB 300 informs the changed status to the core network 500, thereby updating the changed status.

This will be explained in more detail with reference to FIG. 4.

1) While the Home (e)NodeB 300 provides service to the UE 100, the Home (e)NodeB 300 recognizes that a timer to a membership of the UE 100 (e.g., a CSG timer) has expired (S110). The timer may be operated by the Home (e)NodeB 300, or by an external entity (e.g., a specific entity of the core network 500). In the case that the timer is operated by a specific entity of the core network 500, the Home (e)NodeB 300 may acquire information about the expiration of the timer from the specific entity.

2) Then, the Home (e)NodeB 300 requests and receives an allowed CSG ID list for the UE 100 from the UE 100 (S120-

S130). Then, the Home (e)NodeB 300 compares its CSG ID list stored therein, with the allowed CSG ID list received from the UE 100 (S140). Based on a result of the comparison, the Home (e)NodeB 300 determines whether to maintain the UE 100 in the current cell, or to handover the UE 100 to other cell.

Alternatively, the Home (e)NodeB 300 may transmit its CSG ID list to the UE 100. Then, the UE 100 compares its allowed CSG ID list stored therein, with the CSG ID list received from the Home (e)NodeB 300. Based on a result of the comparison, the UE 100 determines whether to stay in the Home (e)NodeB 300, or to perform a handover to other cell.

3) If it is determined in S140 that at least one CSG ID of the allowed CSG ID list of the UE 100 is matched with it in the CSG ID list of the Home (e)NodeB 300, the Home (e)NodeB 300 exchanges information about the matched CSG ID(s) with the core network 500 (S150). The core network 500 or the Home (e)NodeB 300 updates a bearer according to the changed status.

4) If the changed status is updated by the core network 500, the Home (e)NodeB 300 and the UE 100 exchange information about the matched CSG ID(s) with each other (S160). Then, the Home (e)NodeB 300 and the UE 100 update a bearer according to the changed CSG ID. And, the Home (e)NodeB 300 and the UE 100 execute service by using the changed CSG ID.

5) On the contrary, if it is determined in S140 that at least one CSG ID of the allowed CSG ID list of the UE 100 is not matched with it in the CSG ID list of the Home (e)NodeB 300, the UE 100 performs a handover to other suitable CSG cell or macro cell (S170).

FIG. 5 is a flowchart showing a method for controlling access in a Home (e)NodeB operated in a closed access mode according to a second embodiment of the present invention.

According to the second embodiment, the allowed CSG ID list of the UE 100 may be also stored in the core network 500. Accordingly, the Home (e)NodeB 300 acquires the allowed CSG ID list of the UE by request from the core network 500, and then compares the allowed CSG ID list of the UE with its CSG ID list.

This will be explained in more detail with reference to FIG. 5.

1) While the Home (e)NodeB 300 provides service to the UE 100, the Home (e)NodeB 300 recognizes that a timer for a membership of the UE 100 to a specific CSG ID (current CSG ID) of the Home (e)NodeB (e.g., a CSG timer) has expired (S210). The timer may be operated by the Home (e)NodeB 300, or by an external entity (e.g., a specific entity of the core network 500). In the case that the timer is operated by a specific entity of the core network 500, the Home (e)NodeB 300 may acquire information about the expiration of the timer from the specific entity.

2) Then, the Home (e)NodeB 300 request and receives the allowed CSG ID list of the UE 100 from the UE 100 from the core network 500 (S220-S230). Then, the Home (e)NodeB 300 compares its CSG ID list stored therein, with the allowed CSG ID list of the UE 100 (S240). Based on a result of the comparison, the Home (e)NodeB 300 determines whether to maintain the UE 100 in the current cell, or to handover the UE 100 to other cell.

Alternatively, the Home (e)NodeB 300 may transmit its CSG ID list to the core network 500. Then, the core network 500 compares an allowed CSG ID list of the UE stored therein with the CSG ID list received from the Home (e)NodeB 300. Based on a result of the comparison, the core network 500 determines whether to allow the UE 100 to stay in the Home (e)NodeB 300, or to handover the UE 100 to other cell.

3) If it is determined in S240 that at least one CSG ID of the allowed CSG ID list of the UE 100 is matched with any one in to the CSG ID list of the Home (e)NodeB 300, the Home (e)NodeB 300 changes the current ID into the matched CSG ID for the UE 100 and exchanges information about the matched CSG ID(s) with the core network 500 (S250). The core network 500 updates a bearer according to the changed status.

4) If the changed status is updated by the core network 500, the Home (e)NodeB 300 and the UE 100 exchange information about the identical CSG ID(s) with each other (S260). Then, the Home (e)NodeB 300 and the UE 100 update a bearer according to the changed CSG ID. And, the Home (e)NodeB 300 and the UE 100 execute service by using the changed CSG ID.

5) On the contrary, if it is determined in S240 that at least one CSG ID of the allowed CSG ID list of the UE 100 is not matched with it to the CSG ID list of the Home (e)NodeB 300, the UE 100 executes a handover to other suitable CSG cell or macro cell (S270).

FIG. 6 is a flowchart showing a method for controlling access in a Home (e)NodeB operated in a closed access mode according to a third embodiment of the present invention.

According to the third embodiment, the allowed CSG ID list of the UE 100 and the CSG ID list of the Home (e)NodeB 300 may be also stored in the core network 500. The third embodiment is different form the first and second embodiments in that a specific entity of the core network 500 directly determines whether to change the CSG ID.

This will be explained in more detail with reference to FIG. 5.

1) While the Home (e)NodeB 300 provides service to the UE 100, a specific entity of the core network 500 recognizes that a timer for a membership of the UE 100 to a specific CSG ID (or current CSG ID) of the Home (e)NodeB 300 (e.g., a CSG timer) has expired (S310). The timer may be operated by the Home (e)NodeB 300, or by other entity of the core network 500. Here, the specific entity of the core network 500 acquires information about the expiration of the timer, from said other entity or the Home (e)NodeB 300.

2) Then, the specific entity of the core network 500 compares the allowed CSG ID list for the UE 100 stored therein, with the CSG ID list of the Home (e)NodeB 300 stored therein (S320). Based on a result of the comparison, the specific entity of the core network 500 determines whether to maintain the UE 100 in the current cell, or to handover the UE 100 to other cell. The specific entity of the core network 500 may include a Mobility Management Entity (MME), a serving GPRS support node (SGSN), a Mobile-services Switching Centre (MSC), a Home Subscriber Server (HSS), a Home Location Register (HLR), a User Repository, etc.

3) If it is determined in S320 that at least one CSG ID in the allowed CSG ID list for the UE 100 is matched with any one in the CSG ID list of the Home (e)NodeB 300, the specific entity of the core network 500 updates a bearer according to the identical CSG ID(s). Then, the specific entity of the core network 500 transmits, to the Home (e)NodeB 300, a request message requesting change of the CSG ID of the UE, and receives a response message with respect to the request message (S330).

4) If the changed status is updated by the specific entity of the core network 500, the Home (e)NodeB 300 and the UE 100 exchange information about the matched CSG ID(s) with each other (S340). Then, the Home (e)NodeB 300 and the UE 100 change the current CSG ID into the matched CSG ID for the UE 100 and update a bearer according to the changed CSG ID. And, the Home (e)NodeB 300 and the UE 100 execute service by using the matched CSG ID.

5) On the contrary, if it is determined in S320 that at least one CSG ID of the allowed CSG ID list for the UE 100 is not matched with any one in the CSG ID list of the Home (e)NodeB 300, the specific entity of the core network 500 handovers the UE to other suitable CSG cell or macro cell (S350).

Figure 7:
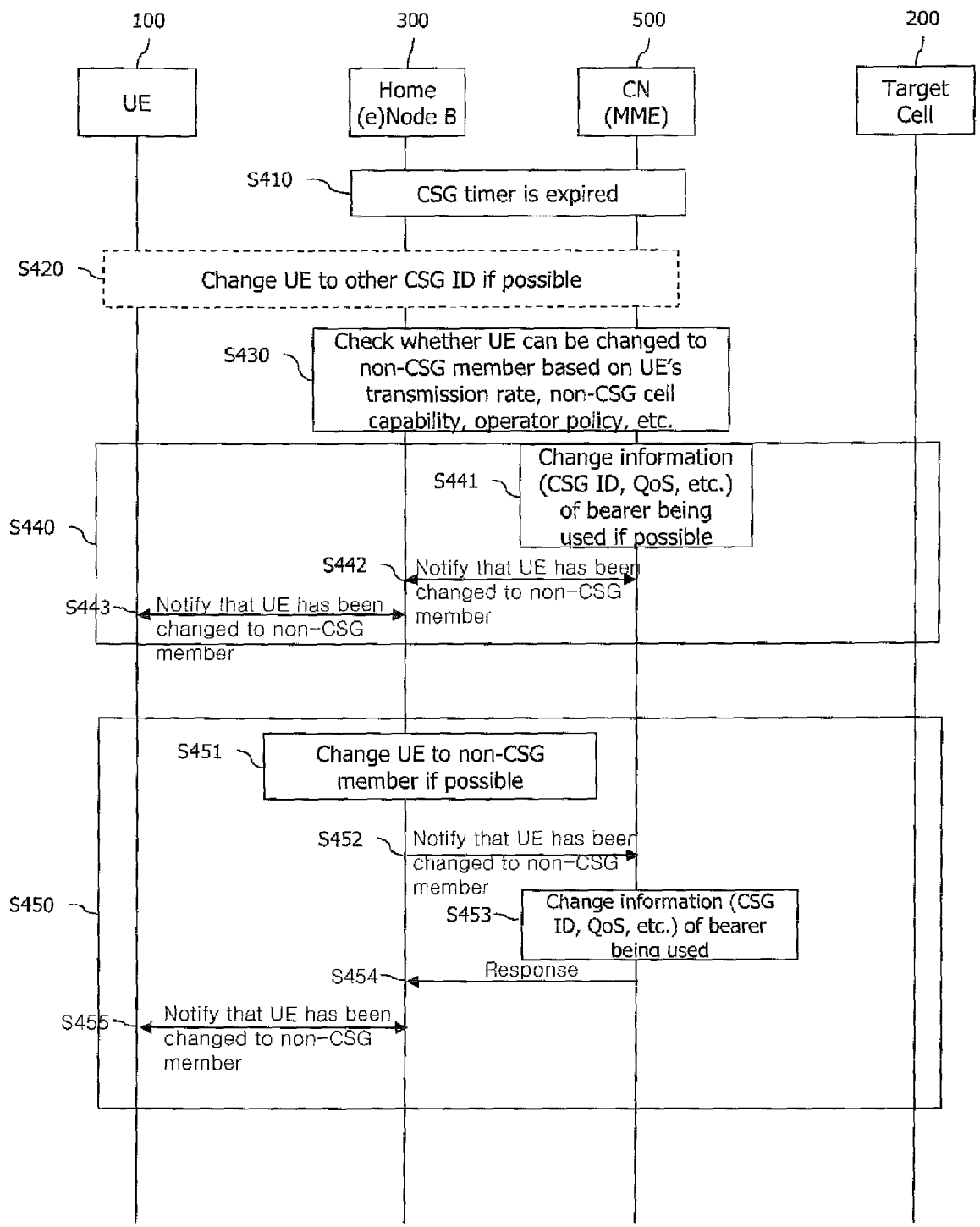
FIG. 7 is a flowchart showing a method for controlling access in a Home (e)NodeB operated in a hybrid access mode according to a fourth embodiment of the present invention.

FIG. 7 is a flowchart showing a method for controlling access in a Home (e)NodeB operated in a hybrid access mode according to a fourth embodiment of the present invention.

In the hybrid access mode, the Home (e)NodeB 300 is operated both in the closed access mode and in the open access mode. The UE 100 may access as a non-CSG member without any permission. However, in this case, the UE 100 corresponding to the non-CSG member may be provided with lower-quality service than that of the CSG If the accessible time (or allowed time) for a membership of UE 100 to the Home (e)NodeB has expired while the UE 100 receives service from the Home (e)NodeB 300 by using the membership, the Home (e)NodeB 300 or the specific entity of the core network 500 changes the UE's membership to a non-CSG member from the CSG member. Accordingly, the UE 100 may be continuously provided with the current service.

For this, it may be checked whether service conditions of the UE such as a bandwidth can be supported even in the non-CSG member. Here, a bandwidth of service required by the UE 100 may be compared with a resource capability of the non-CSG member.

If the resource capability which the Home (e)NodeB provides to the non-CSG member is high enough to allow the bandwidth of service required by the UE 100, information about a session (or bearer) being used by the UE is changed. Then, the changed information is transmitted to the UE 100, the Home (e)NodeB 300, the network entity, etc. And, the UE 100 is changed to a non-CSG member from the CSG member.

On the contrary, if the resource capability which Home (e)NodeB 300 provides to the non-CSG member is deficient, the UE 100 performs a handover to other suitable CSG cell or macro cell.

Alternatively, if the accessible time has expired while the UE 100 as a CSG member receives service from the Home (e)NodeB 300, it may be determined whether the UE 100 can be changed to a member of other CSG ID before determining whether the UE 100 can be changed to a non-CSG member. If it is determined that the UE 100 can not be changed to other CSG ID, the UE 100 is changed to a non-CSG member for service continuity. This may enhance flexibility of access control.

This will be explained in more detail with reference to FIG. 7.

1) While the Home (e)NodeB 300 provides service to the UE 100, the Home (e)NodeB(300) or the specific entity of the core network 500 recognizes that a timer for a membership of the UE 100 to a specific CSG ID of the Home (e)NodeB(e.g., a CSG timer) has expired (S410). The timer may be operated by the Home (e)NodeB 300.

2) At least one of the Home (e)NodeB 300 and the specific entity of the core network 500 checks whether the UE 100 can be changed to a member of other CSG ID according to a network operator policy, and changes the UE 100 to a member of other CSG ID if so. Then, said at least one of the Home (e)NodeB 300 and the specific entity of the core network 500 transmits a notification message to relevant entities to complete the change operation (S420). Whether the UE 100 can be changed to a member of other CSG ID or not may be selectively determined according to a network operator policy or a network management policy. This is similar to the first to third embodiments shown in FIGS. 4 to 6.

3) If the UE 100 can not be changed to a member of other CSG ID or the change is not allowed under a policy, at least one of the Home (e)NodeB 300 and the specific entity of the core network 500 compares a bandwidth of service being provided to the UE 100 with resources capability which the Home (e)NodeB provides to a non-CSG member. Based on a result of the comparison, it is checked whether the UE 100 can operate in a non-CSG member (S430). Here, the checking may be performed based on an additional operator policy. In a similar manner as S440, the UE 100 may be operated as a non-CSG member by the specific entity of the core network 500. Alternatively, in a similar manner as S450, the UE 100 may be operated as a non-CSG member by the Home (e)NodeB (300.

4) Firstly, the specific entity of the core network 500 changes the UE 100 into a non-CSG member (S440). More concretely, the specific entity of the core network 500 changes a session (or bearer) with the UE, and changes a CSG ID or membership, QoS, etc. (S441). Then, the specific entity of the core network 500 informs, to the Home (e)NodeB 300, that the UE has been changed to a non-CSG member (S442). Subsequently, the Home (e)NodeB 300 informs, to the UE 100, that the UE has been changed to a non-CSG member (S443).

5) Alternatively, if the UE 100 can be operated as a non-CSG member, the Home (e)NodeB 300 changes the UE 100 into a non-CSG member (S450).

More concretely, the Home (e)NodeB 300 changes the UE 100 to a non-CSG member (S451), and informs, to the specific entity of the core network 500, that the UE 100 has been changed to a non-CSG member (S452). Then, the specific entity of the core network 500 changes a session (or bearer) with the UE, and transmits a response message to the Home (e)NodeB 300 (S454). Once the response message is received, the Home (e)NodeB 300 informs, to the UE 100, that the UE 100 has been changed to a non-CSG member (S455). The Home (e)NodeB 300 may receive accessible time information of the UE to the CSG by request from the core network 500, or may use the existing information stored therein after being received from the core network 500.

If the UE 100 can not be changed to a non-CSG member, the UE 100 may perform a handover to other CSG cell or macro cell.

Figure 8:
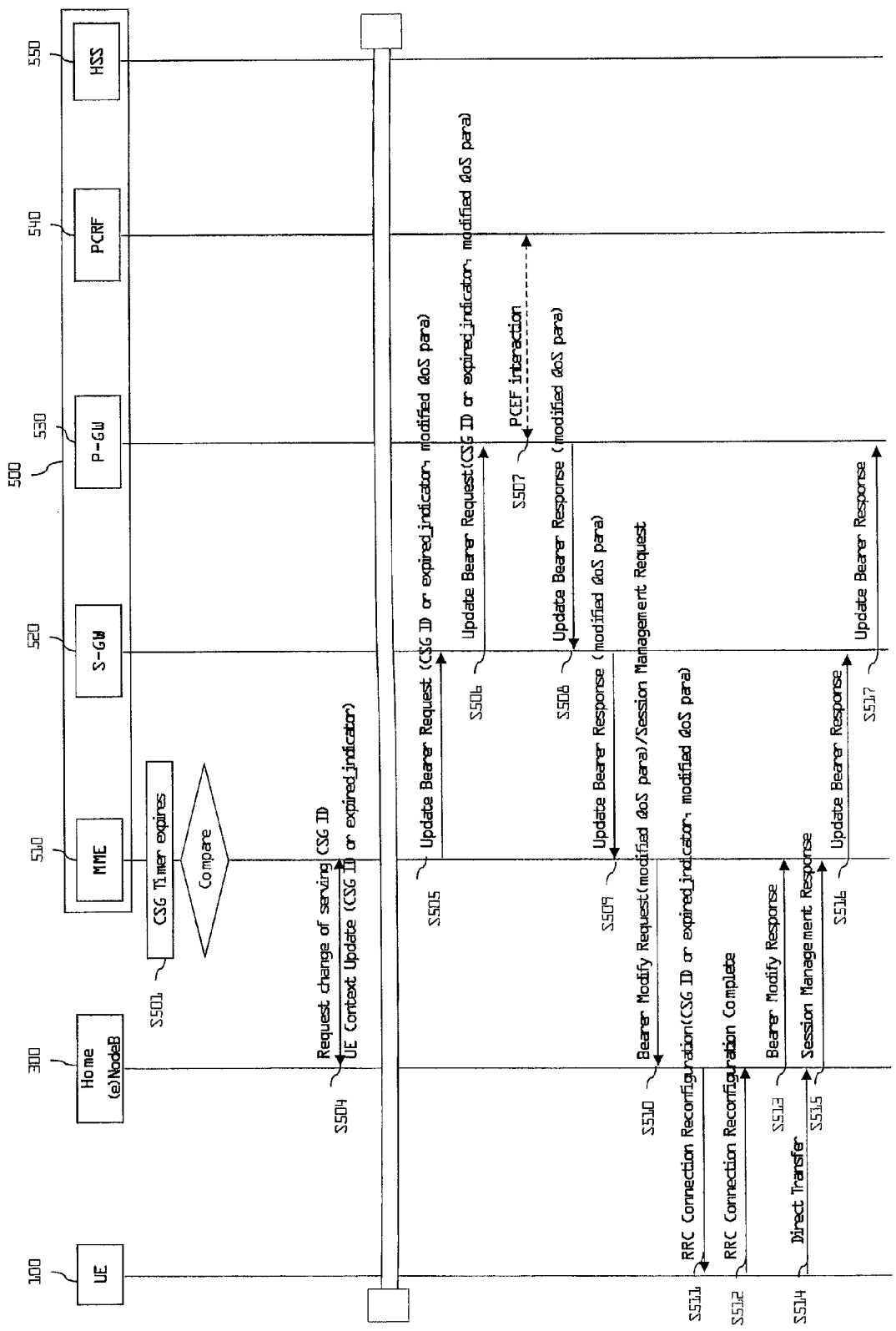
FIG. 8 is a flowchart showing the fourth embodiment of the present invention with details.
Figure 9:
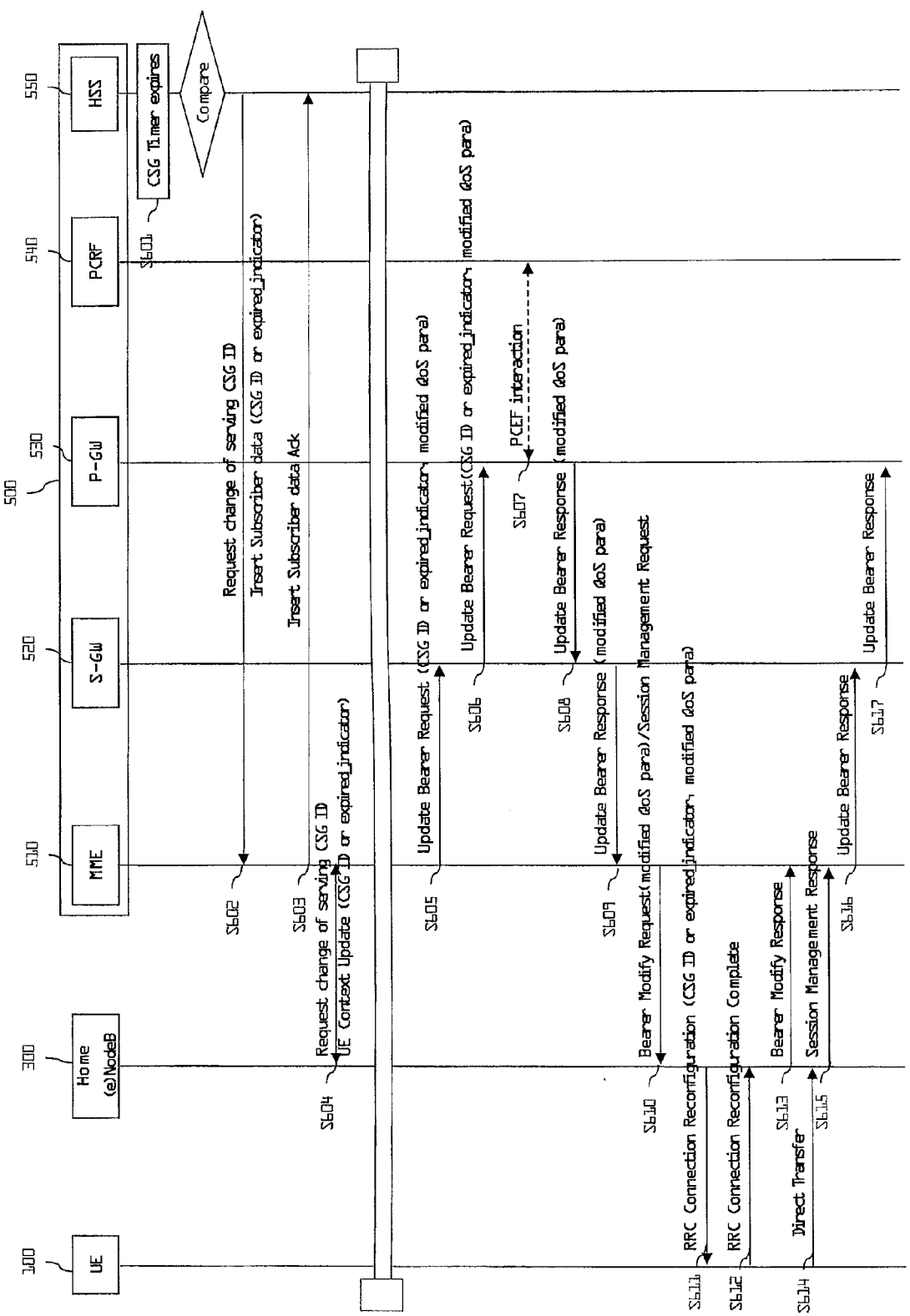
FIG. 9 is a modification example of FIG. 8.

FIG. 8 is a flowchart showing the fourth embodiment of the present invention with details, and FIG. 9 is a modification example of FIG. 8.

FIGS. 8 and 9 show the fourth embodiment of FIG. 7 according to an EUTRAN/EPC system with details. And, FIGS. 8 and 9 may be also applied to the first to third embodiments. FIG. 8 shows the fourth embodiment of FIG. 7 according to an EUTRAN/EPC system. However, the fourth embodiment may be extended to be also used in a 3GPP system. A core network 500 of FIG. 8 comprises a Mobility Management Entity (MME) 510, a Serving Gateway (S-GW) 520, a Packet Data Network Gateway or PDN Gateway (P-GW) 530, a Policy and Charging Rule Function (PCRF) system 540, a Home Subscriber Server (HSS) 550.

The present invention will be explained in more detail with reference to FIGS. 8 and 9.

1) Referring to FIG. 8, while the Home (e)NodeB 300 provides service to the UE 100, the MME 510 of the core network 500 recognizes that a timer for a membership of the UE 100 (e.g., a CSG timer) has expired (S501). In the case that the Home (e)NodeB 300 is operated in a closed access mode or in a hybrid access mode, the MME 510 compares a CSG ID List of the Home (e)NodeB 300 stored therein, with an allowed CSG ID list of the UE 100 stored therein. The CSG ID List of the Home (e)NodeB 300 and the allowed CSG ID list of the UE 100 may be stored in the HSS 550. In this case, the MME 510 receives the CSG ID lists from the HSS 550 by request, and then compares the CSG ID lists with each other.

Alternatively, referring to FIG. 9, the HSS 550 of the core network 500 recognizes that the CSG timer has expired (S601). In the case that the Home (e)NodeB 300 is operated in a closed access mode or in a hybrid access mode, the HSS 550 compares a CSG ID List of the Home (e)NodeB 300 stored therein, with an allowed CSG ID list for the UE 100. The CSG ID List of the Home (e)NodeB 300 and the allowed CSG ID list may be stored in other entity. In this case, the HSS 550 requests and receives the CSG ID lists from said other entity, and then compares the CSG ID lists with each other.

Although not shown, other entity of the core network 500 may recognize that the CSG timer has expired.

2) As shown in FIG. 8, in the case that the MME 510 recognizes expiration of the CSG timer, the MME 510 goes to S504.

Alternatively, as shown in FIG. 9, in the case that the HSS 550 recognizes expiration of the CSG timer, the HSS 550 informs the MME 510 that the UE 100 has a changed membership (S602). The informing method may be different according to whether the Home (e)NodeB 300 is operated in a closed access mode or in a hybrid access mode.

In the case that the Home (e)NodeB 300 is operated in a closed access mode, the HSS 550 transmits, to the MME 510, a message such as an S1 Application Protocol (S1 AP) message or a message notifying change of a membership of the UE 100. The message may include a CSG membership indicator. The message (or the CSG membership indicator) may include other CSG ID supported by the Home (e)NodeB 300.

However, in the case that the Home (e)NodeB 300 is operated in a hybrid access mode, the HSS 550 transmits, to the MME 510, a message notifying change of a membership of the UE 100. The message may include a CSG membership indicator. When there is other CSG ID that can be supported by the Home (e)NodeB 300, the message (or the CSG membership indicator) may include a specific CSG ID rather than said other CSG ID.

The specific CSG ID may indicate a non-CSG member, or may indicate the expired CSG ID. Once the specific CSG ID is received, it can be recognized that the corresponding CSG ID has expired.

The HSS 550 may further include, in the message (or the CSG membership indicator), an indicator informing an expired status of the current CSG ID, or informing that the specific CSG ID (or a current CSG ID) of the UE has changed to a non-CSG member, e.g., an expired_indicator or a deleted_indicator. Then, the MME 510 transmits a response message with respect to the message to the HSS (S603).

3) The MME 510 transmits, to the Home (e)NodeB 300, a message notifying change of a membership of the UE 100, e.g., a UE Context Update message or an S1 AP UE Context Modification Request message (S504, S604). The message may include other CSG ID supported by the Home (e)NodeB 300, or a specific ID or indicator which indicates a non-CSG member rather than said other CSG ID. The message may also include an indicator indicating an expired status of the UE 100, such as an expired_indicator or a deleted_indicator. In the case that a current membership of the UE 100 is changed to other CSG ID or a non-CSG member, the Home (e)NodeB 300 modifies (updates) a radio period (bearer) with the UE 100 according to an operator policy (S504, S604). That is, the Home (e)NodeB 300 may differently establish the bearer according to whether the UE has been changed to other CSG ID or to a non-CSG member. More concretely, in the case that the membership of the UE is changed to a non-CSG member from a CSG member, or to a CSG member from a non-CSG member, the Home (e)NodeB 300 may differently setup the bearer according to whether the UE is a CSG member or not.

4) In the case that QoS of the bearer has modified (updated) due to change of the membership of the UE 100, e.g., due to an operator policy or other reasons, the MME 510 transmits, to the S-GW 520, a bearer update request message (e.g., Update Bearer Request message) according to information (e.g., other CSG ID or non-closed access mode) modified due to the membership change (S505, S605). Here, the Update Bearer Request message may be different according to whether the Home (e)NodeB 300 is operated in a closed access mode or in a hybrid access mode.

In the case that the Home (e)NodeB 300 is operated in a closed access mode, the MME 510 may include, in the Update Bearer Request message, a new CSG ID parameter (1), and a modified QoS parameter (2) which is QoS related information modified according to the new CSG ID parameter. This is shown in the following table 1.

TABLE 1

Updated Bearer Request Message = (1) New CSG ID parameter,
(2) modified QoS parameter In the case that the Home (e)NodeB 300 is operated in a hybrid access mode, the MME 510 may include, in the Update Bearer Request message, a new CSG ID parameter (1), and a modified QoS parameter (2) which is QoS related information modified according to the new CSG ID parameter. This is shown in the following table 2.

TABLE 2

Updated Bearer Request Message = (1) New CSG ID parameter,
(2) modified QoS parameter Alternatively, the MME 510 may include, in the Update Bearer Request message, a specific CSG ID parameter (1) rather than the new CSG ID, and a modified QoS parameter (2) which is QoS related information. This is shown in the following table 3. The specific CSG ID may indicate a non-CSG member, or the expired CSG ID. Once the specific CSG ID is received, it can be recognized that the corresponding CSG ID has expired.

TABLE 3

Updated Bearer Request Message = (1) specific CSG ID parameter,
(2) modified QoS parameter Alternatively, the MME 510 may include, in the Update Bearer Request message, an indicator indicating an expired status of the current CSG ID or an indicator indicating that a membership (or the specific ID) of the UE has been changed to a non-CSG member, such as an expired_indicator or a deleted_indicator (1), and a modified QoS parameter (2) which is QoS related information.

TABLE 4

Updated Bearer Request Message = (1) expired_indicator or
deleted_indicator (2) modified QoS parameter The expired_indicator or deleted_indicator may be further included in the aforementioned Update Bearer Request message shown the tables 1 to 3.

5) The S-GW 520 transmits the Update Bearer Request message to the P-GW 530 (S506, S606).

6) Then, in the case that a Policy and Charging Control (PCC), etc. are used according to an operator policy, the P-GW 530 exchanges the current QoS-related parameters with the modified (updated) QoS-related parameters through a PCRF interaction with the PCRF 540 (S507, S608).

7) Then, the P-GW 530 applies the modified QoS parameters thereto, and transmits a bearer update response message (e.g., Update Bearer Response message) to the S-GW 520 (S508, S608). Here, the Update Bearer Response message may include the modified QoS parameters.

8) The S-GW 520 transmits the received Update Bearer Response message to the MME 510 (S509, S609). And, the S-GW 520 updates its QoS parameter according to a QoS parameter included in the received Update Bearer Response message.

9) Once the Update Bearer Response message has been received, the MME 510 transmits, to the Home (e)NodeB 300, a Bearer Modify Request message, or a Session Management Request message, or an Update Bearer Request message (S510, S610). Here, the Bearer Modify Request message may be different according to whether the Home (e)NodeB 300 is operated in a closed access mode or in a hybrid access mode.

In the case that the Home (e)NodeB 300 is operated in a closed access mode, the MME 510 may include, in the Bearer Modify Request message, a new CSG ID parameter (1), and a modified QoS parameter (2) which is QoS related information modified according to the new CSG ID parameter. This is shown in the following table 5.

TABLE 5

Bearer Modify Request Message = (1) New CSG ID parameter, (2) modified QoS parameter In the case that the Home (e)NodeB 300 is operated in a hybrid access mode, the MME 510 may include, in the Bearer Modify Request message, a new CSG ID parameter (1), and a modified QoS parameter (2) which is QoS related information modified according to the new CSG ID parameter. This is shown in the following table 6.

TABLE 6

Bearer Modify Request Message = (1) New CSG ID parameter, (2) modified QoS parameter Alternatively, the MME 510 may include, in the Bearer Modify Request message, a specific CSG ID parameter (1) rather than the new CSG ID, and a modified QoS parameter (2) which is QoS related information. This is shown in the following table 7. The specific CSG ID may indicate a non-CSG member, or the expired CSG ID. Once the specific CSG ID is received by the Home (e)NodeB 300, it can be recognized that the corresponding CSG ID has expired.

TABLE 7

Bearer Modify Request Message = (1) specific CSG ID parameter, (2) modified QoS parameter Alternatively, the MME 510 may include, in the Bearer Modify Request message, an indicator indicating an expired status of the current CSG ID or an indicator which indicates that the specific ID of the UE has been changed to a non-CSG member, such as an expired_indicator or a deleted_indicator (1), and a modified QoS parameter (2) which is QoS related information.

TABLE 8

Bearer Modify Request Message = (1) expired_indicator or deleted_indicator (2) modified QoS parameter The expired_indicator or deleted_indicator may be further included in the aforementioned Bearer Modify Request message shown the tables 5 to 7.

10) Then, the Home (e)NodeB 300 may modify (update) a radio period (bearer) with the UE 100 based on the QoS parameter. And, the Home (e)NodeB 300 transmits, to the UE 100, an RRC Connection Reconfiguration Request message (S511, S611). The RRC Connection Reconfiguration Request message may include other CSG ID, or a specific ID indicating that the UE is a non-CSG member. Alternatively, the RRC Connection Reconfiguration Request message may further include an expired_indicator. In another alternative manner, the RRC Connection Reconfiguration Request message may further include the modified (update) QoS parameter.

Then, the UE 100 changes to other CSG ID or a non-CSG member, and modifies (or updates) the bearer with the Home (e)NodeB 300 according to the QoS parameter. Then, the UE 100 transmits an RRC Connection Reconfiguration Response message to the MME 510 (S512, S612).

11) Once the RRC Connection Reconfiguration Response message has been received by the MME 510, the MME 510 transmits a Bearer Modify Response message to the S-GW 520 (S513, S613).

12) As a response message with respect to the Session Management Request message, the UE 100 transmits a Session Management Response message, to the Home (e)NodeB 300, with including in a Direct Transfer message (S514, S614). Then, the Home (e)NodeB 300 transmits the Session Management Response message to the MME 510 (S515, S615).

13) Once both the Bearer Modify Response message and the Session Management Response message have completely received, the MME 510 determines the membership change of the UE 100 to be normal. Then, the MME 510 transmits an Update Bearer Response message to the S-GW 520, in response to the received Update Bearer Request message (S516, S616).

14) Once the Update Bearer Response message has been received by the S-GW 520, the S-GW 520 transmits the received Update Bearer Response message to the P-GW 530 (S517, S617).

In addition, the above various embodiments may be implemented by using, computer software, hardware, or some combination thereof. For instance, the method of the present invention may be stored in the storage medium (e.g., internal memory, flash memory, hard disc, etc.), or may be implemented in codes or commands inside a software program that can be executed by a processor such as a microprocessor, a controller, a micro-controller, an application specific integrated circuit (ASIC), etc. This will be explained in more detail with reference to FIG. 10.

Figure 10:
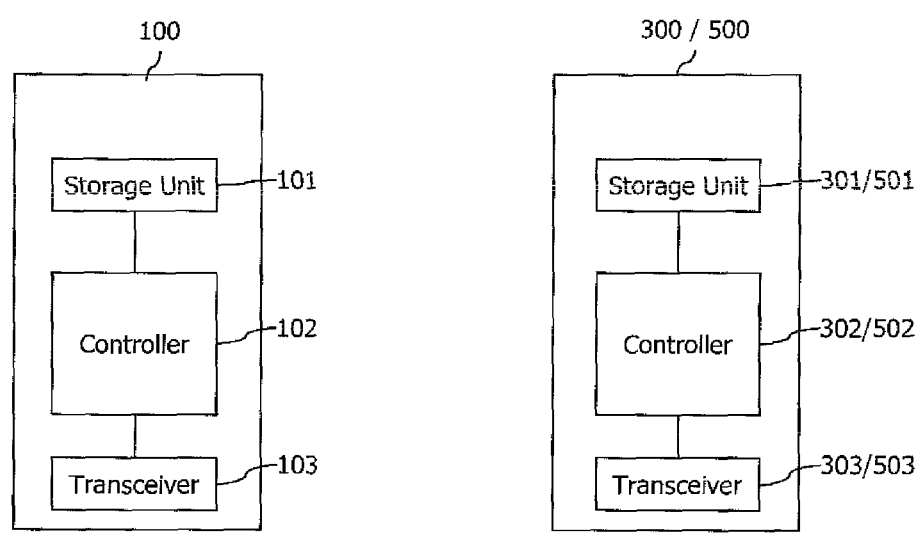
FIG. 10 is a block diagram showing a UE 100, a Home (e)NodeB 300, and a core network 500 according to the present invention.

FIG. 10 is a block diagram showing the UE 100, the Home (e)NodeB 300, and the core network 500 according to the present invention.

Referring to FIG. 10, the UE 100 includes a storage means 101, a controller 102, and a transceiver 103.

The Home (e)NodeB 300 and each entity of the core network 500 include storage means 301/501, controllers 302/502, and transceivers 303/503, respectively.

The storage means 301/501 store software programs including the method shown in FIGS. 4 to 9.

Each of the controllers controls the storage means and the transceivers. More concretely, the controllers execute software programs including the method and stored in the storage means. And, each of the controllers transmits the aforementioned signals through the transceivers.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for receiving information of a user equipment (UE) by an eNodeB, the method comprising:
    receiving, by the eNodeB from a mobility management entity (MME), a request message including QoS-related information and an indication of whether the UE is a closed subscriber group (CSG) member;
    updating, by the eNodeB, context of the UE according to the request message, when the UE is connected to a cell associated with the eNodeB, the cell is operating in a hybrid access mode, and the CSG membership to the cell has expired; and
    transmitting, to the MME, a message indicating that the context of the UE has changed.

2. The method of claim 1, wherein the request message is an S1 AP UE context modification request message.

3. The method of claim 1, wherein the updating context of the UE includes replacing previously stored QoS-related information by the QoS-related information included in the request message.

4. The method of claim 1, wherein the updating context of the UE includes replacing a previously stored CSG membership of the UE by a CSG membership of the UE contained in the request message.

5. An eNodeB for receiving information of a user equipment (UE), the eNodeB comprising:
    a radio frequency unit; and
    a processor configured to:
        receive, from a mobility management entity (MME), a request message including QoS related information and an indication of whether the UE is a closed subscriber group (CSG) member,
        update context of the UE according to the request message, when the UE is connected to a cell associated with the eNodeB, the cell is operating in a hybrid access mode, and the CSG membership to the cell has expired, and
        transmit, to the MME, a message indicating that the context of the UE has changed.

* * * * *